United States Patent
Roe

(10) Patent No.: US 9,066,132 B2
(45) Date of Patent: Jun. 23, 2015

(54) SYSTEMS AND METHODS FOR RECORDING CONTENT FROM A DIFFERENT SOURCE WHEN PREVIOUS CONTENT RUNS OVER

(71) Applicant: United Video Properties, Inc., Santa Clara, CA (US)

(72) Inventor: Glen E. Roe, Simi Valley, CA (US)

(73) Assignee: Rovi Guides, Inc., Santa Clara, CA (US)

(*) Notice: Subject to any disclaimer, the term of this patent is extended or adjusted under 35 U.S.C. 154(b) by 222 days.

(21) Appl. No.: 13/892,957

(22) Filed: May 13, 2013

(65) Prior Publication Data

US 2014/0337893 A1   Nov. 13, 2014

(51) Int. Cl.
| | |
|---|---|
| H04N 5/76 | (2006.01) |
| H04N 21/433 | (2011.01) |
| H04N 21/462 | (2011.01) |
| H04L 12/54 | (2013.01) |

(52) U.S. Cl.
CPC ....... H04N 21/4334 (2013.01); H04N 21/4622 (2013.01); H04L 12/56 (2013.01)

(58) Field of Classification Search
USPC .................................................. 386/291, 296
See application file for complete search history.

(56) References Cited

U.S. PATENT DOCUMENTS

| | | | |
|---|---|---|---|
| 6,185,360 B1 | 2/2001 | Inoue et al. | |
| 7,882,520 B2 * | 2/2011 | Beach et al. | 725/37 |
| 8,254,762 B2 | 8/2012 | Wang et al. | |
| 2004/0078817 A1 * | 4/2004 | Horowitz et al. | 725/58 |
| 2008/0134252 A1 * | 6/2008 | Bhogal et al. | 725/58 |
| 2008/0285943 A1 * | 11/2008 | Wang et al. | 386/83 |
| 2010/0162305 A1 * | 6/2010 | Downey et al. | 725/39 |
| 2010/0260473 A1 * | 10/2010 | Newell et al. | 386/83 |
| 2010/0303441 A1 * | 12/2010 | Arques et al. | 386/241 |
| 2011/0286719 A1 * | 11/2011 | Woods | 386/293 |

FOREIGN PATENT DOCUMENTS

| | | |
|---|---|---|
| EP | 2398250 A2 | 12/2011 |
| WO | WO 2007080564 | 7/2007 |
| WO | WO 2010120439 | 10/2010 |

* cited by examiner

*Primary Examiner* — Mahesh Dwivedi
(74) *Attorney, Agent, or Firm* — Ropes & Gray LLP

(57) ABSTRACT

Systems and methods for recording content from a different source when previous content runs over are provided. A recording of a first media asset from a first content source is scheduled. The first media asset is scheduled for transmission from the first content source at a start time following a scheduled transmission end time of a second media asset from the first content source. Transmission of the second media asset from the first content source is determined to run past the scheduled end time. A determination is made, based on a visual component and/or an audible component of the second media asset, that transmission of the first media asset at the start time from the first content source has been changed to a second content source. The recording of the first media asset is modified to record the first media asset at the start time from the second content source.

20 Claims, 4 Drawing Sheets

SYSTEMS AND METHODS FOR RECORDING CONTENT FROM A DIFFERENT SOURCE WHEN PREVIOUS CONTENT RUNS OVER

BACKGROUND

Typically, changes to scheduled program recordings are performed using information contained in an update to guide information. For example, a program may be scheduled for recording from a given channel. At some point before the start of the program, an update is received indicating a different channel for that program and the recording is modified accordingly. These systems, however, fail to consider the content of a program for information pertaining to a change in the scheduled recording of another program.

SUMMARY

These and other objects are accomplished in accordance with the principles of the present invention by sounding a message identifying a content source to a user during an advertisement.

In some embodiments, a recording of a first media asset from a first content source may be scheduled. The first media asset may be scheduled for transmission at a start time from the first content source. The start time of the first media asset may follow a scheduled end time of transmission of a second media asset from the first content source. In some implementations, the start time may be immediately adjacent to the end time of the transmission of the second media asset. In some embodiments, other media assets may be transmitted between the end time of the second media asset and the start time of the first media asset.

A detection may be made that the transmission of the second media asset from the first content source will continue beyond the scheduled end time. Specifically, a determination that the second media asset will have an overrun may be performed. In some implementations, the detection may be made based on a trigger received in the video signal of the second media asset. The detection may be made based on a trigger received from an external or alternative source (e.g., an Internet source that is different from the first content source). In some implementations, the detection may be made based on a visual/audible component of the second media asset. In particular, a score or time remaining in the second media asset may be processed to determine that the second media asset will be transmitted beyond the scheduled end time.

In some embodiments, responsive to detecting that the second media asset will continue to be transmitted beyond the scheduled end time, at least one of a visual component(s) and an audible component(s) of the second media asset may be processed. The at least one of a visual component and an audible component may be processed to determine whether a content source from which the first media asset was originally-scheduled to be transmitted at the start time has been changed from the first content source to a second content source. In some implementations, textual information (e.g., closed-caption information or background information) included in the second media asset may be cross-referenced with a database to determine whether words/phrases in the textual information indicate a change in the content source of the first media asset. In some embodiments, the word/phrase may identify the second content source. In some implementations, audible components of the second media asset may be converted to text using a speech-to-text engine to generate the textual information.

In some implementations, the visual component may include at least one of closed-caption information, a score associated with the second media asset, a visual prompt, and a banner that includes a message that indicates the that the content source from which the first media asset was originally-scheduled to be transmitted at the start time has been changed. In some implementations, the audible component may include an audible message or announcement that indicates that the content source from which the first media asset was originally scheduled to be transmitted at the start time has been changed.

In some embodiments, the scheduled recording of the first media asset may be modified to record the first media asset at the start time from the second content source instead of the first content source. In some implementations, the first media asset may be recorded from the second content source while the second media asset continues to be transmitted from the first content source. In some embodiments, the second content source may be related to the first content source. Specifically, the second content source may be affiliated or be associated with a same entity as the first content source (e.g., ESPN1 and ESPN2).

In some embodiments, at least one of the visual component(s) and the audible component(s) of the second media asset from the first content source may continue to be monitored while the first media asset is being recorded from the second content source. A determination may be made as to when transmission of the second media asset will end based on monitoring at least one of the visual component(s) and the audible component(s) of the second media asset. The scheduled recording of the first media asset may be modified to record the first media asset from the first content source instead of the second content source when the second media asset ends. In some implementations, a first portion of the first media asset is recorded from the first content source and a second portion of the first media asset is recorded from the second content source.

In some embodiments, the first and second media assets may be first and second sporting events. The first sporting event may be scheduled for transmission from a first content source before the second sporting event is transmitted from the same first content source. The second sporting event may be selected (manually or automatically) for recording. While the first sporting event is being transmitted, the visual/audible component of the first sporting event may be processed. A determination may be made that the first sporting event will have an overrun. Because of the overrun, the first content source may modify the transmission source of the second sporting event to allow the first sporting event to finish being transmitted while allowing the second sporting event to begin transmission at the scheduled start time. Such a system enables users to continue watching either event without missing the beginning of the second sporting event due to the delay. If the second sporting event were not transmitted at the scheduled start time from a new content source, the beginning of the second sporting event would be missed by users watching outside of the event (e.g., at home) as the sporting event would have started before transmission of the sporting event was made available to the users.

The visual/audible component of the first sporting event may identify a new content source from which the second sporting event (selected for recording) will be transmitted at the original scheduled start time. Specifically, a ticker, banner or announcer may notify users watching the first sporting event that the second sporting event will be transmitted from the new content source instead of the current first content source. Information included in the ticker, banner or announcer may be extracted to identify the new content source and a recording parameter of the second sporting event may be modified to cause the second sporting event to be recorded from the new content source at the original scheduled start time.

In some embodiments, the scheduled recording of the first media asset may be modified to record the first media asset from the second content source instead of the first content source at some point in the middle of the transmission of the first media asset. In particular, the first media asset may initially start being recorded from a first content source and at some point in the middle or elsewhere (e.g., 10 minutes after the start time of the media asset) of the transmission of the media asset, an event may cause the first media asset to be transmitted from a second content source instead of the first content source. In some implementations, at least one of the visual component(s) and the audible component(s) of the first media asset from the first content source may be monitored while the first media asset is being recorded from the first content source to detect the event (e.g., an interruption, breaking news announcement or service alert message). In some implementations, the at least one of a visual component(s) and an audible component(s) may be processed to determine whether a content source from which the first media asset is being transmitted has been changed from the first content source to a second content source. Responsive to determining that the content source of the first media asset has been changed, the recording of the first media asset may be modified to continue recording the first media asset from the second content source instead of the first content source. Accordingly, a first portion of the first media asset (e.g., the portion preceding the event) may be recorded from the first content source and a second portion of the first media asset (e.g., the portion following the event) may be recorded from the second content source.

BRIEF DESCRIPTION OF THE DRAWINGS

The above and other features of the present invention, its nature, and various advantages will be more apparent upon consideration of the following detailed description, taken in conjunction with the accompanying drawings, and in which.

DETAILED DESCRIPTION OF EMBODIMENTS

Figure 1:
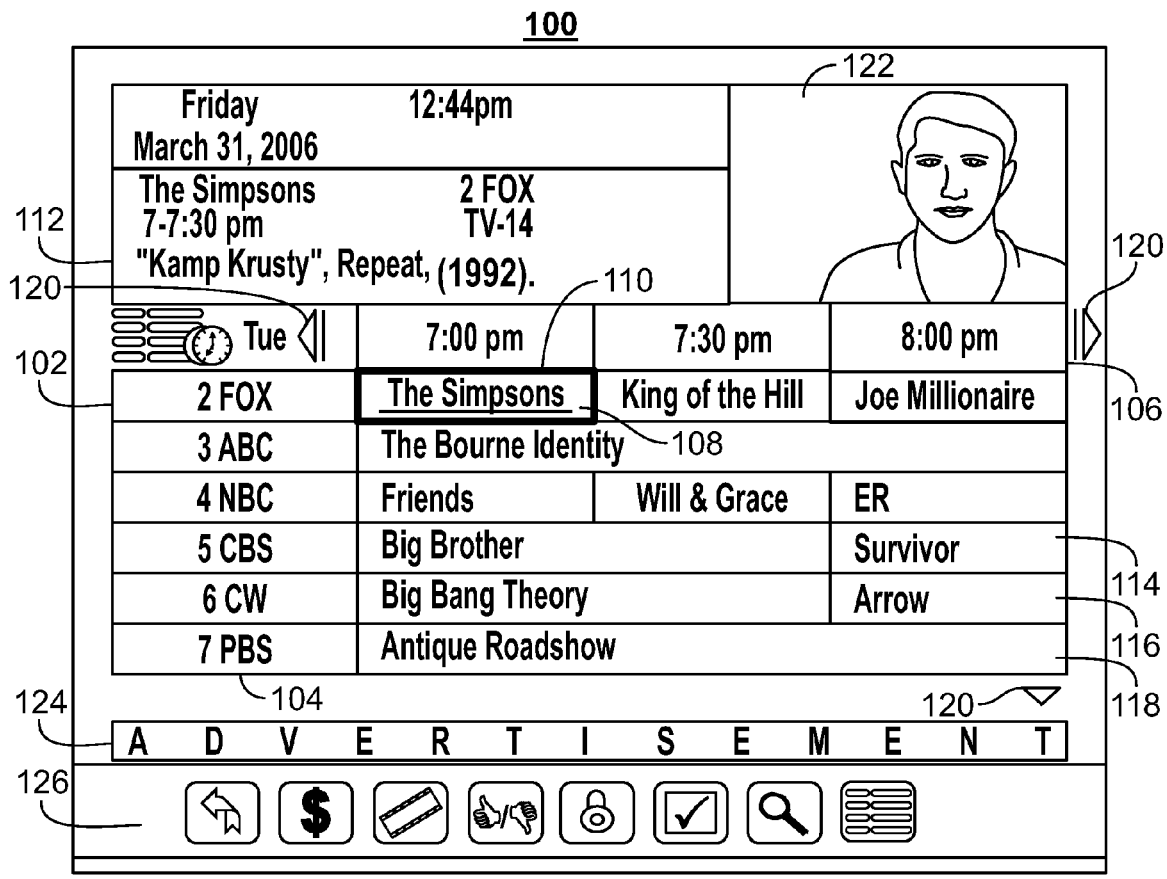
FIG. 1 is a diagram of an interactive grid display in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

Each media asset may include or be associated with certain subject matter. The subject matter or content included in or associated with a given media asset may change while the media asset is being presented. For example, one portion of the media asset may include commercials/advertisements (e.g., one form or type of subject matter) and another portion of the media asset may include portions of the plot. In another example, the media asset may include an action segment in one portion and a drama segment in another. Subject matter may be predefined in a media asset data structure received from a remote source (as discussed below). In some implementations, subject matter may be determined on-the-fly automatically based on an analysis of the content being presented to the user. For example, closed-caption information may be processed to determine the subject matter of the content being presented.

As referred to herein the phrase "subject matter" refers to any content criterion or characteristic associated with the media asset. For example, subject matter may indicate whether a portion of a media asset is a commercial/advertisement segment, whether a portion of a media asset is a plot segment, a type of the media asset, category of the media asset, genre of the media asset, content source of the media asset (e.g., broadcast source, Internet source, on-demand source, music type of source, music type of channel, video type of source, video type channel, etc.), time of day (e.g., morning, afternoon, evening), or any combination thereof.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, subject matter information, and any other type of guidance data that is helpful for a user to navigate among and locate desired content selections.

Figure 2:
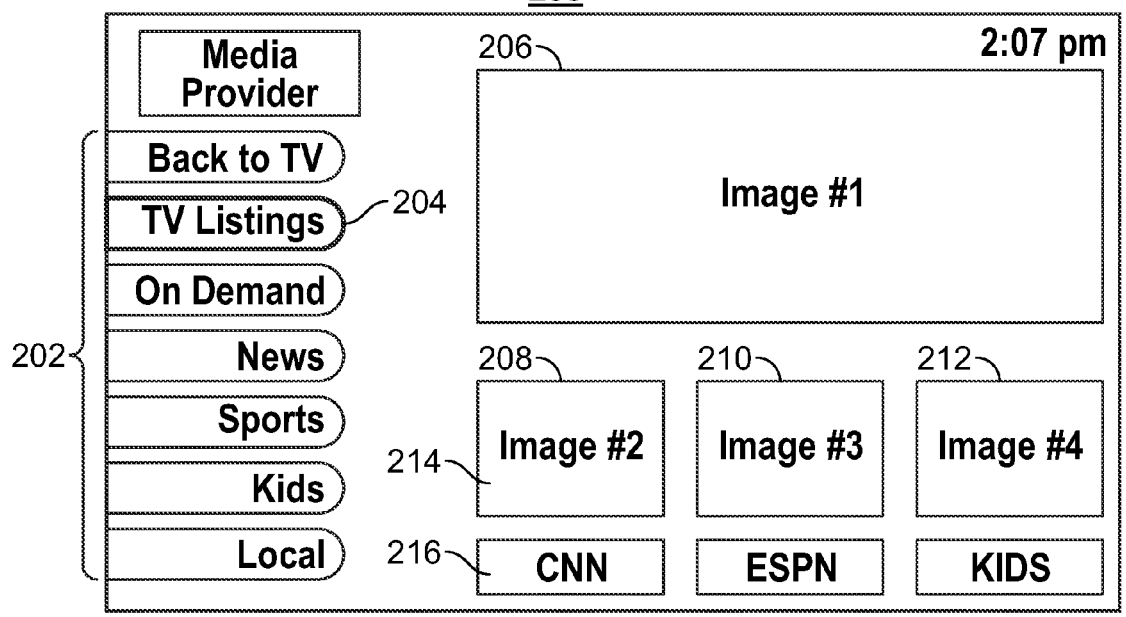
FIG. 2 is a diagram of an interactive media system in accordance with some embodiments of the disclosure.
Figure 5:
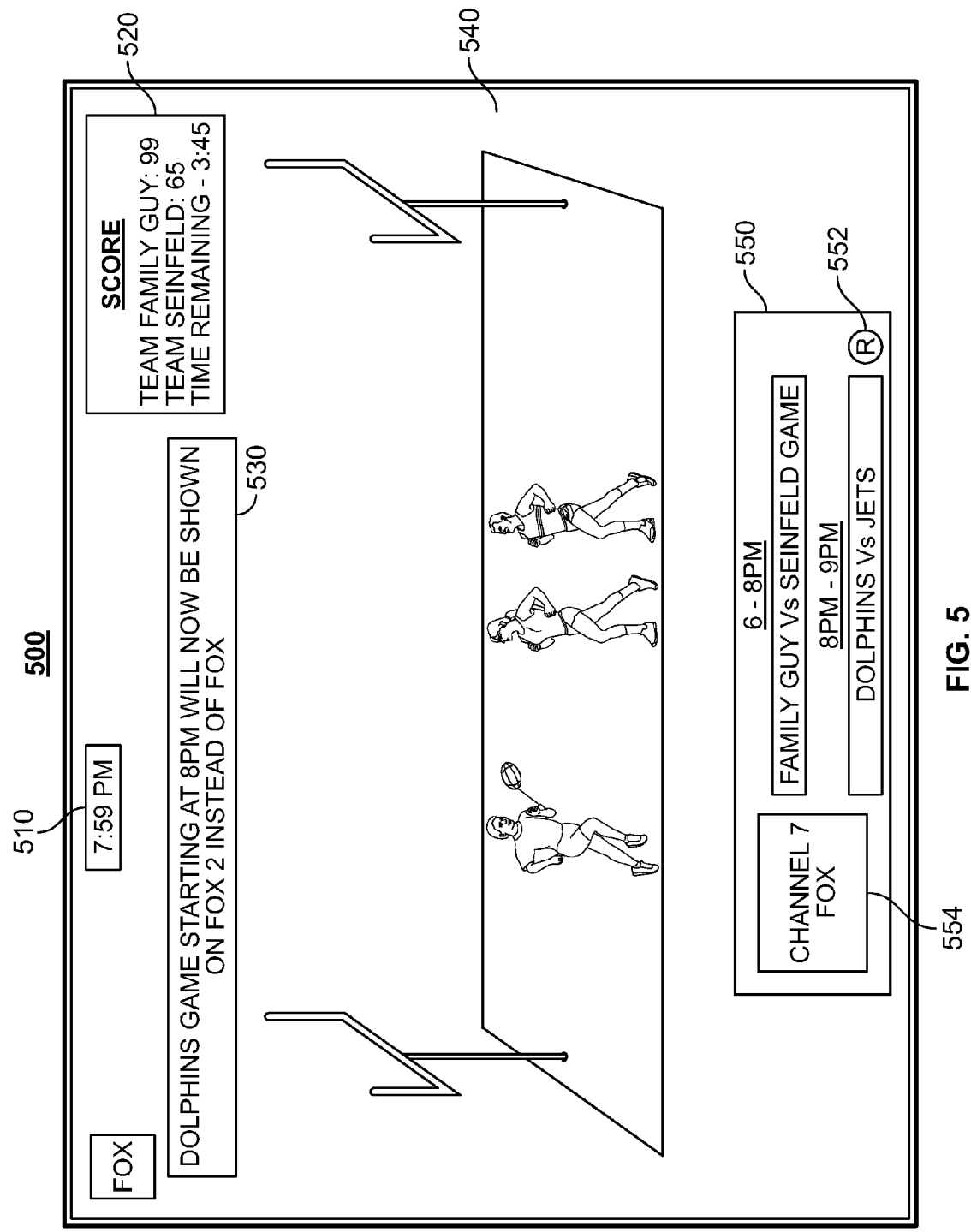
FIG. 5 shows an illustrative display screen of a media asset that includes information about a change affecting a scheduled recording of another media asset in accordance with an embodiment of the disclosure.

FIGS. 1-2 show illustrative display screens that may be used to provide media guidance data. The display screens shown in FIGS. 1-2 and 5 may be implemented on any suitable user equipment device or platform. While the displays of FIGS. 1-2 and 5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available or media asset characteristics; and (2) a row of time identifiers 106, where each time identifier (which is a cell in the row) identifies a time block of programming. The media asset characteristics indicated in column of channel/content type identifiers 104 may include any combination of criteria that identifies a plurality of media assets (e.g., content source of a respective one of the media assets, a content type of the respective one of the media assets, or a content category of the respective one of the media assets). Although grid 102 is a by time-channel grid, any other type of grid may be provided such that time is shown on one dimension and a media characteristic is shown on another. For example, grid 102 may be arranged so that time is shown as in grid 102 and the column of identifiers may represent categories of different media assets or types of content sources (e.g., satellite and Internet). In particular, instead of showing the different programs available on a given channel (e.g., channel 2, FOX) at various times, grid 102 may display different programs that are of the genre or category (comedy) at various times regardless of what source they are received from.

Grid 102 also includes cells of program listings, such as program listing 108, where each listing provides the title of the program provided on the listing's associated channel and time. As referred to herein, the term "program" should be understood to be synonymous with "media," "media asset," "asset," and/or "content". With a user input device, a user can select program listings by moving highlight region 110. Information relating to the program listing selected by highlight region 110 may be provided in program information region 112. Region 112 may include, for example, the program title, the program description, the time the program is provided (if applicable) (e.g., the transmission time of the program), the channel or content source of the program (if applicable), the program's rating, and other desired information.

In addition to providing access to linear programming (e.g., content that is scheduled to be transmitted to a plurality of user equipment devices at a predetermined transmission time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 102 may provide media guidance data for non-linear programming including on-demand listings, recorded content listings, and Internet content listings. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.) Specifically, the user may navigate along the time dimension to later or earlier times using icons 120.

In some embodiments, a user may select a given media asset listing from grid 102 for recording. For example, a user may highlight one of the listings that corresponds to a given media asset (e.g., "Dolphins v. Jets", a sporting event scheduled for transmission from ESPN, a first content source). The user may select an option (e.g., on-screen selectable option or a button on an input device) to schedule recording of the selected media asset. Control circuitry 304 may store parameters of the selected media asset for recording the media asset when the media asset is scheduled for transmission from the first content source. For example, control circuitry 304 may store in storage 308 as the recording parameters the first content source from which the media asset is scheduled for transmission, a start time of the scheduled transmission, and an end time of the scheduled transmission, and/or a title or unique identifier of the media asset. Based on the recording parameters, control circuitry 304 may control a storage device to begin recording or storing the media asset at the start time from the specified first content source and end recording at the end time. In some implementations, control circuitry 304 may also include in the parameters a list of any number of media assets, and/or their respective scheduled transmission start and end times, which are scheduled for transmission before the selected media asset from the same first content source.

In some embodiments, at a time period (user selected or predetermined amount) before the start time of the scheduled recording specified in the recording parameters, control circuitry 304 may retrieve the list of media assets specified in the recording parameters. In some implementations, the time period may correspond to the start time of the media asset that immediately precedes the start time of the media asset selected for recording (e.g., a media asset that is scheduled for transmission between 7-8 PM where the media asset selected for recording starts at 8 PM). In some implementations, the time period may correspond to the start time of the media asset that precedes the start time of the media asset selected for recording by any amount of time (e.g., one or more media assets that are scheduled for transmission between 4-8 PM where the media asset selected for recording starts at 8 PM).

Control circuitry 304 may monitor the visual/audible components (e.g., announcer, banners displayed in the media asset, real-time sports ticker/information) of those media assets to determine whether one or more of those media assets will continue to be transmitted beyond their respective scheduled end time. As referred to herein, the term "overrun" or the phrase "have an overrun" refers to a situation in which a media asset continues to be transmitted beyond the scheduled end time of the media asset. In some embodiments, control circuitry 304 may receive a trigger in the video signal of the media asset being monitored indicating that the media asset will have an overrun. The trigger may include digital/analog information that includes instructions, that are not displayed or presented to the user, that cause control circuitry 304 to store information indicating that the media asset will have an overrun. Control circuitry 304 may then act in accordance with the stored information indicating the overrun to modify a scheduled recording of a media asset scheduled for transmission after the media asset that has the overrun. In some embodiments, control circuitry 304 may determine that the media asset will have an overrun based on a trigger received in the video signal of the media asset being monitored indicating that the media asset will have an overrun and/or monitoring the visual/audible components of the media asset.

The embodiments described pertain to the trigger(s) being received in the video signal of a given media asset. However, in some implementations, the trigger may be received from an alternate source (e.g., a source different from the source of the media asset) while the media asset is being received from a given source. The alternate source may be a supplemental data feed or Internet source.

In response to determining that one of the media assets in the list stored in the recording parameters will have an overrun, control circuitry 304 may process the visual/audible components of the media asset (e.g., "Family Guy v. Seinfeld" or "Bulls vs. Heat", a sporting event scheduled for transmission from ESPN, the first content source) having the overrun to determine whether the visual/audible components correspond to the media asset selected for recording. Control circuitry 304 may also determine whether the visual/audible components corresponding to the media asset selected for recording identify a second content source (e.g., ESPN2) from which the media asset selected for recording will be transmitted at the stored scheduled start time. In response to determining that the visual/audible components identify a new content source for the media asset selected for recording, control circuitry 304 may modify the content source specified in the recording parameters to correspond to the second content source. Accordingly, at the start time specified in the recording parameters for the media asset, the media asset will be recorded from the second content source instead of the previously stored first content source.

In some embodiments, while the media asset is being recorded, control circuitry 304 may monitor the visual/audible components (e.g., announcer, banners displayed in the media asset, and/or real-time sports ticker/information) of the media asset being recorded to determine whether the visual/audible components identify a third content source (e.g., ESPN3) from which the media asset being recorded will continue to be transmitted. In response to determining that the visual/audible components identify a third content source for the media asset selected for recording, control circuitry 304 may modify the content source specified in the recording parameters to correspond to the third content source. Accordingly, the media asset will continue to be recorded from the third content source instead of the second content source. In some implementations, the third content source may be the same as the original first content source of the media asset selected for recording. In such circumstances, when the recording of the media asset ends at the scheduled end time of the media asset, a portion of the media asset that is recorded corresponds to the portion of the media asset that was received from the second content source and another portion of the media asset that is recorded corresponds to the portion of the media asset that was received from the third content source.

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to, or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include VOD options, parental control options, Internet options, volume control options, cloud-based options, device synchronization options, second screen device options, accessibility settings options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, automatic dynamic volume rate change control, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200, the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
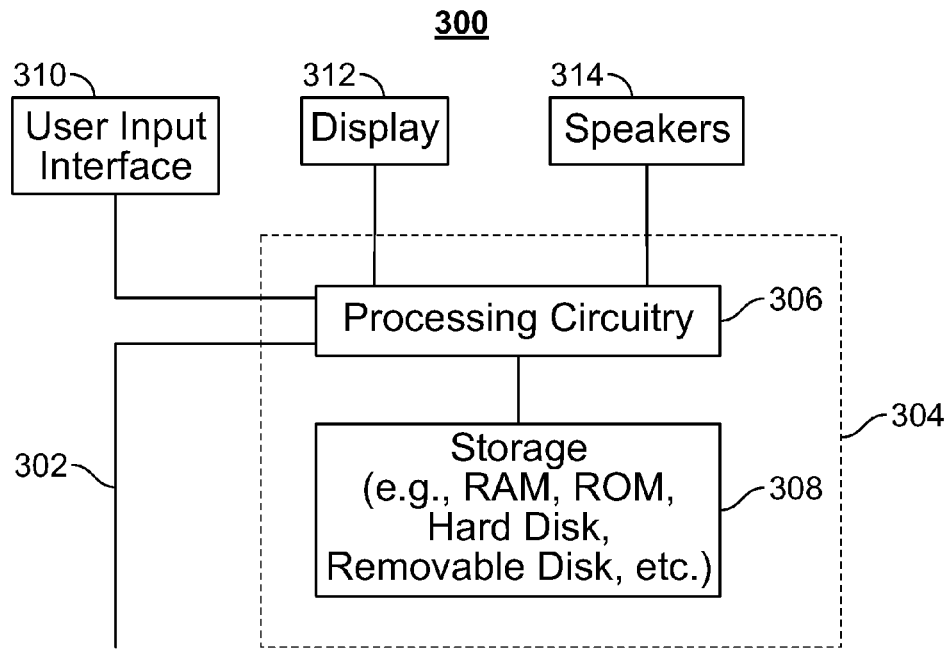
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiples of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

In some embodiments, a database of visual/audible components may be stored in storage 308. The database may include a mapping between visual/audible components (e.g., words, pictures, videos, and/or sounds) and a content source identifier (e.g., content source name, channel name and/or number). The visual/audible components may include a list of visual components such as graphics, phrases, sounds or words that identify content sources and/or media assets. For example, the visual/audible components may include a list of forms or ways that a given content source can be represented. Specifically, a given content source (e.g., FOX) may be represented by words or phrases commonly associated with the content source and/or graphical symbols that represent the content source. The visual/audible components may include a list of the different words/phrases/graphical symbols typically associated with each different content source. Control circuitry 304 may cross-reference visual/audible components of a given media asset with the database to identify the content source associated with the visual/audible components of a given media asset.

As referred to herein, the phrase "visual component" means any portion of a given media asset that can be seen by a user or that is displayed on a screen when accessing the given media asset. As referred to herein, the phrase "audible component" means any portion of a given media asset that can be heard by a user through an audio device (e.g., speakers or headphones) when accessing the given media asset.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314. For example, speakers 314 may be used to sound an audible message that identifies a content source to the user and/or indicates that the content being received includes an advertisement.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
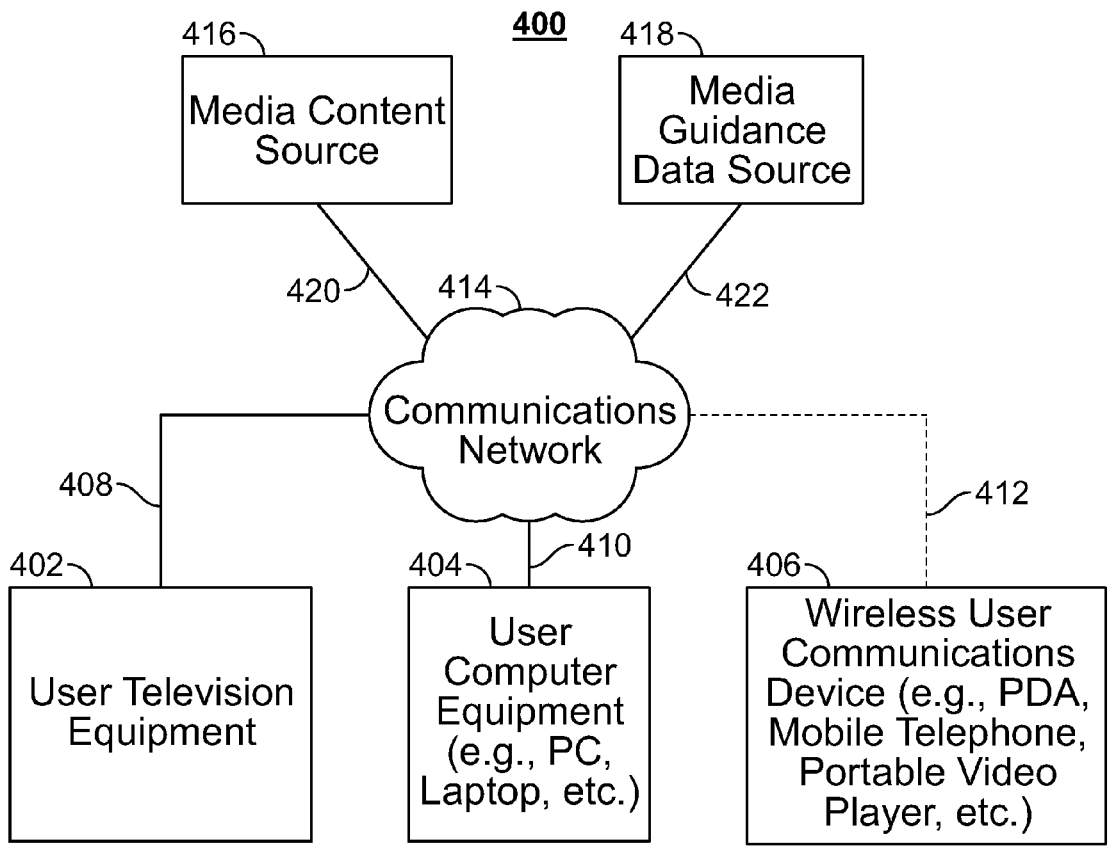
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, target volume levels, volume thresholds, volume adjustment rates, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels. In some embodiments, a database that maps content source identifiers to audible messages that are stored in storage 308 may be received from data source 418.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct control circuitry 304 to generate the guidance application displays and transmit the generated displays to the user equipment devices. The server application may instruct control circuitry 304 of the media guidance data source 418 to transmit data for storage on the user equipment. The client application may instruct control circuitry 304 of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, which provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same type. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, a first media asset may be scheduled for recording. The first media asset may be scheduled for transmission from a first content source after a second media asset is scheduled to end transmission from the content source. The visual/audible components of the second media asset may be monitored to determine whether the second media asset has an overrun. Alternatively or in addition, a trigger may be received in the video signal of the second media asset indicating that the second media asset will have an overrun. In response to determining that the second media asset will have an overrun, control circuitry 304 may monitor the visual/audible components of the second media asset to determine whether information about change in the scheduled transmission of the first media asset is provided. In some implementations, the information may indicate that the first media asset is scheduled for transmission at the originally-scheduled start time from a second content source instead of the first content source. Control circuitry 304 may update recording parameters of the first media asset to cause the first media asset to be recorded from the second content source instead of the first content source at the originally-scheduled start time of the first media asset. In some implementations, the information may indicate that the first media asset is scheduled for transmission at a later start time from the first content source. Control circuitry 304 may update recording parameters of the first media asset to cause the first media asset to be recorded from the first content source at the later start time. This disclosure is described in the context of sporting event type media assets but is applicable to any other type of media asset.

FIG. 5 shows an illustrative display screen 500 of a media asset that includes information about a change affecting a scheduled recording of another media asset in accordance with an embodiment of the disclosure. Screen 500 may include a media asset 540, a banner region 530, a media asset information region 550, and a score region 520.

Media asset 540 may be any content that is currently being shown or received over a given content source (e.g., television channel). Media asset 540 may be a sporting event (e.g., Family Guy v. Seinfeld or Bulls vs. Heat). Media asset 540 may include visual and/or audible components. The visual components may include images/frames of media asset 540 that are presented on a display device. The audible components may include sounds of media asset 540 that are output through speakers.

Media asset information region 550 may include any information associated with one or more media assets. In some embodiments, control circuitry 304 may receive a user request to present region 550. This request may be received by way of the user pressing a "BROWSE" key on a remote control. In response to this request, control circuitry 304 may access a program schedule database to identify the media assets scheduled for transmission in the current time interval (e.g., 6-8 PM) over the currently tuned content source (e.g., channel 7, FOX). Control circuitry 304 may determine based on the retrieved schedule information for the currently tuned content source the title of the media asset currently being shown. Control circuitry 304 may present that information in region 550. Control circuitry 304 may also present an identifier 554 of the currently tuned or selected content source.

In some embodiments, control circuitry 304 may retrieve from the program schedule database, information that identifies a plurality of other media assets scheduled for transmission at a later time interval than the current time interval. For example, if the current time interval is the period between 6-8 PM, control circuitry 304 may also retrieve the information that identifies the media assets scheduled for transmission between the interval of 8-9 PM. Control circuitry 304 may present the title of the media asset scheduled for transmission during the current time interval and/or the title of the media asset scheduled for transmission during the next time interval.

For example, region 550 includes an indication of the current time interval (6-8 PM) and the title of the first media asset "Family Guy v. Seinfeld" or "Bulls vs. Heat" scheduled for transmission during the current time interval. Region 550 also includes an indication of the next time interval (8-9 PM) and the title of the second media asset "Dolphins v. Jets" scheduled for transmission during the next time interval.

In some implementations, the second media asset may have been scheduled for recording. In some embodiments, the second media asset may have been automatically scheduled for recording (e.g., automatically selected for recording based on a user profile). In some embodiments, the second media asset may have been manually scheduled for recording (e.g., by a user highlighting a program listing and instructing control circuitry 304 to record the corresponding program). In some implementations, control circuitry 304 may determine from the program schedule database whether the second media asset has been scheduled for recording. In response to determining that the second media asset has been scheduled for recording, control circuitry 304 may include a visual indication 552 in region 550 to inform the user that the second media asset has been scheduled for recording. The recording parameters associated with the second media asset may be stored in the program schedule information in storage 308. The recording parameters may include a title, a start time, stop time, and content source. For example, for the second media asset, the recording parameters may be the title "Dolphins v. Jets", starting at 8 PM, stopping at 9 PM from content source, "Channel 7".

In some embodiments, control circuitry 304 may monitor visual/audible component(s) of the first media asset when control circuitry 304 determines that the second media asset has been scheduled for recording from a same content source as the first media asset. In particular, control circuitry 304 may monitor the visual/audible component(s) of a first media asset that is scheduled for transmission from a given content source before a second media asset is scheduled for transmission from the given content source when control circuitry 304 determines that the second media asset has been scheduled for recording. For example, the second media asset "Dolphins v. Jets" may be scheduled to start being recorded at a start time of the scheduled transmission time (e.g., 8 PM) from the Channel 7 content source. Since the first media asset "Family Guy v. Seinfeld" is scheduled for transmission during a period (e.g., 6-8 PM) that precedes the start time (e.g., 8 PM) of the second media asset and the first media asset is also transmitted by the Channel 7 content source, control circuitry 304 may monitor the visual/audible components of the first media asset.

In some embodiments, the visual/audible component(s) of the first media asset may be monitored to determine whether the first media asset will include an overrun. In some embodiments, in addition or alternatively, the visual/audible components of the first media asset may be monitored to determine whether the content source from which the second media asset is scheduled for transmission has changed. Specifically, the visual/audible components of the first media asset may be monitored to determine whether the second media asset will be transmitted from a second content source (e.g., Channel 8) instead of the first content source (e.g., Channel 7) at the scheduled start time of the second media asset (e.g., 8 PM).

In some embodiments, control circuitry 304 may monitor only one visual component of the first media asset to determine whether the second media asset will be transmitted from a different content source. In some embodiments, control circuitry 304 may monitor only one audible component of the first media asset to determine whether the second media asset will be transmitted from a different content source. In some embodiments, control circuitry 304 may monitor multiple visual components of the first media asset to determine whether the second media asset will be transmitted from a different content source. In some embodiments, control circuitry 304 may monitor multiple audible components of the first media asset to determine whether the second media asset will be transmitted from a different content source. In some embodiments, control circuitry 304 may monitor only one visual component of the first media asset and only one audible component of the first media asset to determine whether the second media asset will be transmitted from a different content source. In some embodiments, control circuitry 304 may monitor multiple visual components of the first media asset and multiple audible components of the first media asset to determine whether the second media asset will be transmitted from a different content source.

In some embodiments, control circuitry 304 may monitor only one visual component of the first media asset to determine that the first media asset will have an overrun. In some embodiments, control circuitry 304 may monitor only one audible component of the first media asset to determine that the first media asset will have an overrun. In some embodiments, control circuitry 304 may monitor multiple visual components of the first media asset to determine that the first media asset will have an overrun. In some embodiments, control circuitry 304 may monitor multiple audible components of the first media asset to determine that the first media asset will have an overrun. In some embodiments, control circuitry 304 may monitor only one visual component of the first media asset and only one audible component of the first media asset to determine that the first media asset will have an overrun. In some embodiments, control circuitry 304 may monitor multiple visual components of the first media asset and multiple audible components of the first media asset to determine that the first media asset will have an overrun.

In some embodiments, upon determining that the content source from which the second media asset will be transmitted has changed, control circuitry 304 may modify the recording parameters of the second media asset. Specifically, control circuitry 304 may determine that the second media asset will be transmitted at 8 PM from Channel 8 instead of from Channel 7. Accordingly, control circuitry 304 may modify the content source recording parameter to be Channel 8 instead of Channel 7.

After recording of the second media asset begins from the second content source, in some embodiments, control circuitry 304 may monitor visual/audible components of the second media asset while the second media asset is being recorded. For example, the second media asset "Dolphins v. Jets" may be scheduled to start being recorded at a start time of the scheduled transmission time (e.g., 8 PM) from the second content source Channel 8. Control circuitry 304 may monitor the visual/audible components of the second media asset starting at 8 PM from the second content source.

The visual/audible components of the second media asset may be monitored to determine whether the content source from which the second media asset is now scheduled for transmission has changed back to be the first content source. Specifically, the visual/audible components of the second media asset may be monitored to determine whether the second media asset will be transmitted from the first content source (e.g., the originally-scheduled content source, Channel 7) instead of the second content source (e.g., Channel 8) at some point during the transmission and recording of the second media asset (e.g., 8:30 PM). In some implementations, change in content source for the second media asset, a second time, may occur when transmission of the first media asset ends (e.g., at the end of the sporting event, Family Guy v. Seinfeld or Bulls vs. Heat). In particular, when the first media asset is determined to have an overrun, the second media asset may be scheduled for transmission at the original start time from a different content source (e.g., second content source) instead of the first content source only until transmission of the first media asset ends (e.g., the end of the overrun). Once transmission of the first media asset ends, transmission of the second media asset may return to be from the first content source instead of the second content source. In some embodiments, the visual/audible components of the first media asset may continue to be monitored while the second media asset is being recorded to detect when transmission of the first media asset ends. At that point, a determination may be made based on visual/audible components of the first or second media asset and/or based on an updated media asset schedule information, that transmission of the second media asset will be changed back to the first content source from the second content source.

In some embodiments, upon determining that the content source from which the second media asset will be transmitted has changed again, control circuitry 304 may modify the recording parameters of the second media asset. Specifically, control circuitry 304 may determine that the second media asset will be transmitted at 8:30 PM (e.g., at some point during the middle of the second media asset transmission) from Channel 7 instead of from Channel 8. Accordingly, control circuitry 304 may modify the content source recording parameter to be Channel 7 instead of Channel 8.

In some embodiments, once a given media asset starts being recorded from a given content source specified in the associated recording parameters, control circuitry 304 may monitor visual/audible components of the given media asset while the given media asset is being recorded. The visual/audible components of the given media asset may be monitored to determine whether the content source from which the given media asset is being transmitted has changed to an alternate content source. Specifically, the visual/audible components of the given media asset may be monitored to determine whether the given media asset will be transmitted from an alternate content source (e.g., an Internet content source, website) instead of the given content source (e.g., television channel or other website or Internet address) at some point during the transmission and recording of the given media asset.

In some implementations, change in content source for the given media asset, may occur when transmission of the given media asset is interrupted (e.g., an emergency service announcement is made or a breaking news segment replaces the transmission of the given media asset from the given content source). In some embodiments, upon determining that the content source from which the given media asset will be transmitted has changed, control circuitry 304 may modify the recording parameters of the given media asset. Specifically, control circuitry 304 may determine that the given media asset will be transmitted at 8:30 PM (e.g., at some point during the middle of the given media asset transmission) from an Internet content source instead of from the current content source (e.g., television channel or other Internet address). Accordingly, control circuitry 304 may modify the content source recording parameter to be the Internet content source instead of the current content source. In such circumstances, a portion of the given media asset is recorded from one content source and another portion is recorded from another content source.

In some embodiments, visual components of media assets that are monitored may include score information. For example, first media asset 540 may include a sporting event having a score. The score information may indicate whether the media asset will likely have an overrun. For example, score information region 520 may include a score for each team or athlete in the sporting event and/or time information. The time information may indicate how much time remains in the media asset sporting event. For example, the time information may indicate how much time has elapsed in a given period or quarter of the sporting event. Control circuitry 304 may analyze and process the information contained in score information region 520 to determine whether the media asset will have an overrun. In particular, control circuitry 304 may retrieve the scheduled end time (e.g., 8 PM) of media asset 540 from a program schedule information database. Control circuitry 304 may approximate how much time is left in media asset 540 using the time remaining information in region 520. For example, time remaining information may indicate that over 3 minutes are left in the sporting event. Control circuitry 304 may add to the current time 510 (e.g., 7:59 PM) the time remaining to arrive at the approximate end time of media asset 540 (e.g., 8:02 PM). Control circuitry 304 may compare the approximate end time (e.g., 8:02 PM) with the scheduled end time (e.g., 8:00 PM) of media asset 540. If the approximate end time is later than the scheduled end time, control circuitry 304 may detect an overrun in media asset 540.

In some embodiments, control circuitry 304 may retrieve a type of sporting event for media asset 540. For example, the type may indicate whether the media asset end time is determined by a measure of the score or by a defined time period. When the end time of the media asset is defined by a score (e.g., the end of the sporting event is not reached until a given team or athlete achieves a particular score), control circuitry 304 may analyze the scores indicated in region 520. Control circuitry 304 may determine whether the score indicated in region 520 has exceeded the predefined minimum for the sporting event. If the score has not exceeded the minimum, control circuitry 304 may determine whether there is a greater than threshold amount (e.g., more than 1 minute) left until the scheduled end time (e.g., 8 PM) is reached. When there is less than or equal to the threshold amount of time left until the scheduled end time and the predefined minimum score has yet to be reached, control circuitry 304 may detect an overrun.

In some embodiments, control circuitry 304 may detect an overrun in first media asset 540 based on a trigger received in the video signal associated with first media asset 540. For example, a trigger may include instructions that instruct control circuitry 304 to execute a subroutine for an overrun. The trigger may identify a new scheduled end time and information that indicates the possibility in an overrun in media asset 540.

In some embodiments, visual components of media assets that are monitored may include textual information overlaid on top or adjacent to media asset 540. For example, first media asset 540 may include banner region 530 in which textual information is presented. The textual information may include score information for other similar sporting events, closed-caption information for media asset 540, weather reports, real-time news/score information, and/or any other type of textual content associated with or supplemental to media asset 540. Control circuitry 304 may process the textual information to identify keywords that may indicate an overrun in media asset 540 and/or a change in the content source for the second media asset that is scheduled for transmission after media asset 540 and which has been scheduled for recording. Keywords may include any information included in the recording parameters for the second media asset, a title or a portion of the title of the second media asset, athletes or character names associated with the second media asset, or any other list of phrases that may indicate an overrun (e.g., "overtime", "will not end on time", or the like). The keywords may be stored in a database. Control circuitry 304 may cross-reference the words/phrases with the database of keywords to identify a match. The database may indicate what action is associated with the match (e.g., whether the match indicates an overrun or a change in content source).

In response to determining that one of the words/phrases in the textual information matches a keyword, control circuitry 304 may determine whether the keyword is associated with an overrun or a change in content source. For example, the keyword "overtime" may indicate that media asset 540 will have an overrun. Accordingly, control circuitry 304 may perform an action associated with the overrun (e.g., extend a scheduled recording and/or monitor for a change in content source for the second media asset). Alternatively or in addition, when control circuitry 304 detects that the textual information matches a keyword identifying the second media asset, control circuitry 304 may process adjacent words in the textual information to determine whether there has been a change to the content source of the second media asset. For example, control circuitry 304 may detect that the textual information identifies the second media asset (e.g., "Dolphins v. Jets") by a portion of the title (e.g., "Dolphins" game). The adjacent words may indicate that the identified media asset will be shown on a second content source (e.g., FOX2, Channel 8) "instead" of the first content source (e.g., FOX, Channel 7). In response, control circuitry 304 may update the recording parameters of the second media asset to cause the second media asset to be recorded from the second content source at the scheduled start time of 8 PM instead of the first content source.

In some embodiments, audible components of media assets that are monitored may include voices of announcers/narrators/persons speaking in media asset 540. For example, the voices may be processed by control circuitry 304 which may perform speech-to-text conversion on the sounds to output textual information. The textual information that is output from the speech-to-text conversion may include score information for other similar sporting events, closed-caption information for media asset 540, weather reports, real-time news/score information, and/or any other type of textual content associated with or supplemental to media asset 540. Control circuitry 304 may process the textual information to identify keywords that may indicate an overrun in media asset 540 and/or a change in the content source for the second media asset that is scheduled for transmission after media asset 540 and which has been scheduled for recording. Keywords may include any information included in the recording parameters for the second media asset, a title or a portion of the title of the second media asset, athletes or character names associated with the second media asset, or any other list of phrases that may indicate an overrun (e.g., "overtime", "will not end on time", or the like).

In response to determining that one of the words/phrases in the textual information that is output from the speech-to-text conversion matches a keyword, control circuitry 304 may determine whether the keyword is associated with an overrun or a change in content source. For example, the keyword "overtime" may indicate that media asset 540 will have an overrun. Accordingly, control circuitry 304 may perform an action associated with the overrun (e.g., extend a scheduled recording and/or monitor for a change in content source for the second media asset). Alternatively or in addition, when control circuitry 304 detects that the textual information that is output from the speech-to-text conversion matches a keyword identifying the second media asset, control circuitry 304 may process adjacent words in the textual information to determine whether there has been a change to the content source of the second media asset. For example, control circuitry 304 may detect that the textual information identifies the second media asset (e.g., "Dolphins v. Jets") by a portion of the title (e.g., "Dolphins" game). The adjacent words may indicate that the identified media asset will be shown on a second content source (e.g., FOX2, Channel 8) "instead" of the first content source (e.g., FOX, Channel 7). In response, control circuitry 304 may update the recording parameters of the second media asset to cause the second media asset to be recorded from the second content source at the scheduled start time of 8 PM instead of the first content source.

In some embodiments, control circuitry 304 may detect the change in content source of the second media asset based on a trigger received in the video signal associated with first media asset 540. For example, a trigger may include instructions that instruct control circuitry 304 to change the content source recording parameter of the recording parameters of the second media asset to identify the second content source instead of the first content source.

In some embodiments, a media asset may be scheduled for recording from a first content source. The scheduled recording of the media asset may be modified to record the first media asset from the second content source instead of the first content source at some point in the middle of the transmission of the media asset. In particular, the media asset may initially start being recorded from a first content source and at some point in the middle or elsewhere (e.g., 10 minutes after the start time of the media asset) of the transmission of the media asset, an event may cause the first media asset to be transmitted from a second content source instead of the first content source. For example, a news alert (event or disruption) may disrupt transmission of the media asset from the first content source. In order to prevent discontinuity in receipt/recording of the media asset, the media asset may be transmitted from a second content source instead when the disruption (event) occurs.

In some implementations, at least one of the visual component(s) and the audible component(s) of the media asset from the first content source may be monitored while the first media asset is being recorded from the first content source to detect the event or disruption (e.g., an interruption, breaking news announcement or service alert message). For example, control circuitry 304 may monitor the video and/or audio of the media asset to detect the service alert or news alert. In some implementations, control circuitry 304 may process the at least one of a visual component(s) and an audible component(s) to determine whether a content source from which the first media asset is being transmitted has been changed from the first content source to a second content source. For example, the news alert may include information about the media asset transmission indicating that transmission will resume or continue from another content source while the news alert is being provided. Specifically, a breaking news segment may interrupt transmission of the media asset from the first content source (e.g., Channel 1) and may include an announcement indicating that transmission of the media asset will resume from another content source (e.g., Channel 2). In some implementations, the determination and detection of the event or interruption may be based on a trigger received in the video signal of the media asset. The trigger may include instructions that identify the interruption or event and indicate from which other content source (i.e., the second content source) the transmission of the media asset will resume or continue.

Responsive to determining that the content source of the media asset has been changed, control circuitry 304 may modify the recording of the media asset to continue recording the media asset from the second content source instead of the first content source. Accordingly, a first portion of the media asset (e.g., the portion preceding the event or news alert) may be recorded from the first content source and a second portion of the media asset (e.g., the portion following the event or news alert) may be recorded from the second content source.

In some embodiments, a media asset may be scheduled for recording from a first content source. The scheduled recording of the media asset may be modified to record the first media asset at a later time at some point in the middle of the transmission of the media asset. In particular, the media asset may initially start being recorded from a first content source and at some point in the middle or elsewhere (e.g., 10 minutes after the start time of the media asset) of the transmission of the media asset, an event may cause transmission of the first media asset to be terminated and postponed to a later time/date. For example, a news alert (event or disruption) may disrupt transmission of the media asset from the first content source. In order to prevent discontinuity in receipt/recording of the media asset, the media asset may be re-transmitted at a later time/date when the disruption (event) occurs. The retransmission may be from the same first content source or a different content source as discussed above.

In some implementations, at least one of the visual component(s) and the audible component(s) of the media asset from the first content source may be monitored while the first media asset is being recorded from the first content source to detect the event or disruption (e.g., an interruption, breaking news announcement or service alert message). For example, control circuitry 304 may monitor the video and/or audio of the media asset to detect the service alert or news alert. In some implementations, control circuitry 304 may process the at least one of a visual component(s) and an audible component(s) to determine whether the media asset will be retransmitted or continue to be transmitted at a later time/date. For example, the news alert may include information about the media asset transmission indicating that transmission will resume, restart or continue at some point in the future. Specifically, a breaking news segment may interrupt transmission of the media asset from the first content source (e.g., at 6 PM) and may include an announcement indicating that transmission of the media asset will resume or restart at 10 PM. In some implementations, the determination and detection of the event or interruption may be based on a trigger received in the video signal of the media asset. The trigger may include instructions that identify the interruption or event and indicate the time/date (and content source if different from the first content source) that the transmission of the media asset will resume, restart or continue.

Responsive to determining that transmission of the media asset has been postponed, control circuitry 304 may modify the recording of the media asset to continue or restart recording of the media asset at the later time/date (and if applicable from a different content source). Accordingly, a first portion of the media asset (e.g., the portion preceding the event or news alert) may be recorded from the start time to one point in time and a second portion of the media asset (e.g., the portion following the event or news alert) may be recorded from the time/date when transmission resumes or restarts until the end of the media asset.

The above and below discussion of embodiments pertain to visual/audible components of first media asset 540 being displayed. However, control circuitry 304 may perform the same or similar functions without actually displaying first media asset 540. Control circuitry 304 may tune or access the content source of first media asset 540 without displaying the media asset, and may process the visual/audible components that would have been displayed if the user were watching the media asset, in order to detect an overrun and/or a change to a content source of another media asset.

Figure 6:
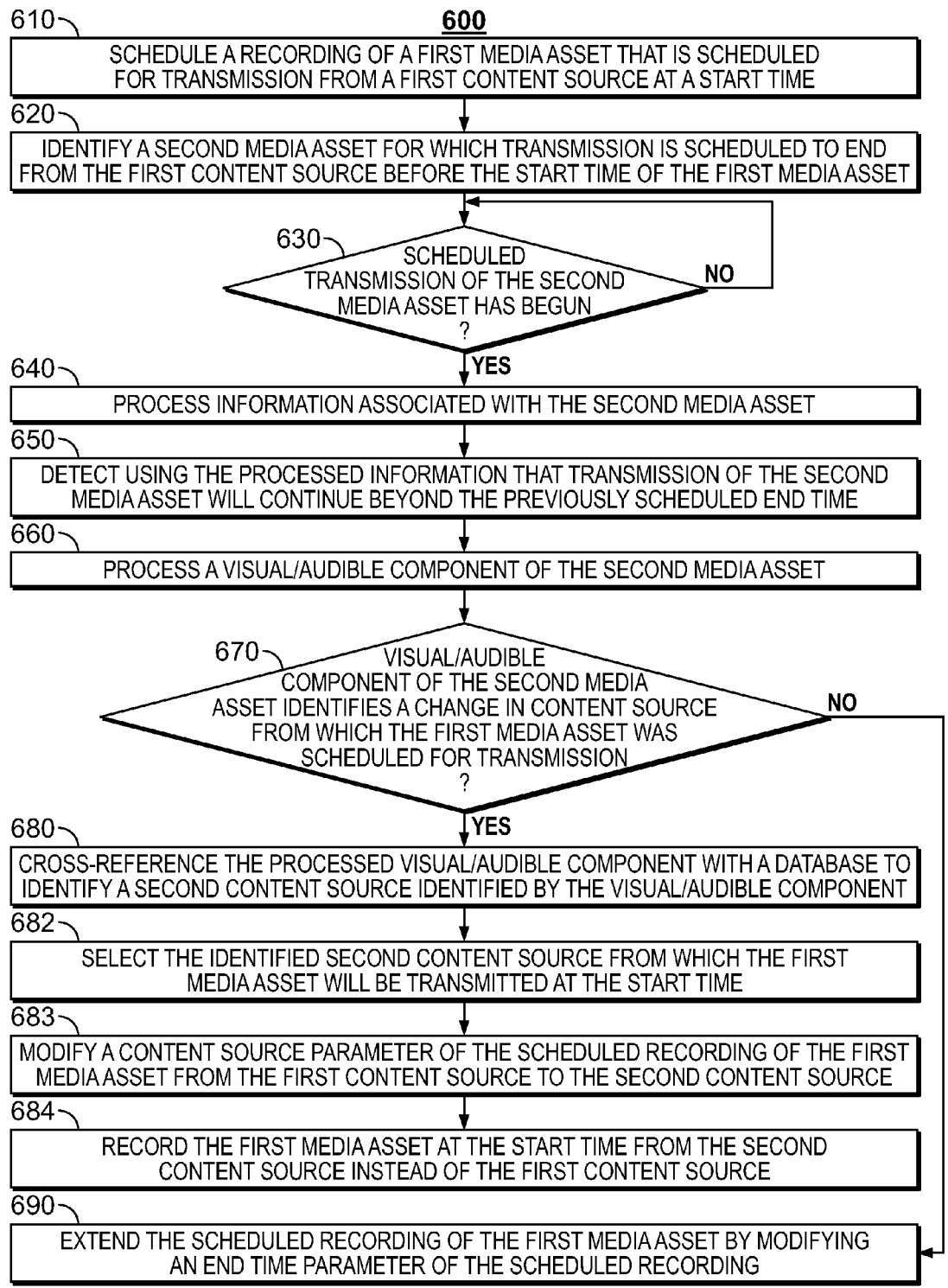
FIG. 6 is a flow diagram describing the process of processing audible/visual components of a second media asset to modify recording parameter of a first media asset in accordance with some embodiments of the disclosure.

FIG. 6 is a flow diagram describing the process 600 of processing audible/visual components of a second media asset to modify recording parameter of a first media asset in accordance with some embodiments of the disclosure. At step 610, a recording of a first media asset is scheduled, where the first media asset is scheduled for transmission from a first content source at a start time. For example, control circuitry 304 may automatically select the first media asset for recording based on a user profile. Alternatively or in addition, control circuitry 304 may receive a user selection of the first media asset and a request to schedule the first media asset for recording.

At step 620, a second media asset is identified for which transmission is scheduled to end from the first content source before the start time of the first media asset. For example, control circuitry 304 may retrieve from a program schedule information database a list of media assets scheduled for transmission from the first content source before the start time of the first media asset. Specifically, control circuitry 304 may generate an SQL query that includes an identifier of the first content source and the start time of the first media asset and that requests a list of one or more media assets and their corresponding start times preceding the start time of the first media asset. The SQL query may be transmitted to a local or remote database which may return the list of one or more media assets (e.g., that includes the second media asset) scheduled for transmission before the start time from the first content source. The second media asset may be a media asset that is scheduled for transmission during a time interval that immediately precedes the scheduled start time of the first media asset (e.g., the second media asset may be scheduled for transmission from 7-8 PM where the first media asset is scheduled for transmission between 8-9 PM). Alternatively, the second media asset may be a media asset that is scheduled for transmission during a time interval that is some amount of time before the scheduled start time (e.g., the second media asset may be scheduled for transmission from 5-6 PM where the first media asset is scheduled for transmission between 8-9 PM). Specifically, a third media asset may be scheduled for transmission between transmission of the first and second media assets.

At step 630, a determination is made as to whether the scheduled transmission of the second media asset has begun. In response to determining that transmission of the second media asset has begun, the process proceeds to step 640, otherwise the process proceeds to step 630.

At step 640, information associated with the second media asset is processed. For example, control circuitry 304 may process information received in a trigger included in a video signal of the second media asset. Alternatively or in addition, control circuitry 304 may process a visual/audible component of the second media asset. Specifically, control circuitry 304 may process score information or time remaining information associated with the second media asset.

At step 650, the processed information is used to detect that transmission of the second media asset will continue beyond the previously scheduled end time. For example, control circuitry 304 may use the information included in the trigger and/or the visual/audible component of the second media asset to determine whether the second media asset will have an overrun.

At step 660, a visual/audible component of the second media asset is processed. For example, control circuitry 304 may process textual information presented with the second media asset to identify one or more keywords. Alternatively or in addition, control circuitry 304 may perform speech-to-text techniques to convert voice or sounds of the second media asset into textual information. Control circuitry 304 may transmit an SQL query to a database to determine whether the textual information includes keywords that are stored in the database. The keywords may indicate whether the second media asset will have an overrun and/or whether there is a change in content source of the first media asset.

At step 670, a determination is made as to whether the visual/audible component of the second media asset identifies a change in content source from which the first media asset was scheduled for transmission. In response to determining that the visual/audible component identifies a change, the process proceeds to step 680, otherwise the process proceeds to step 690. For example, control circuitry 304 may receive an indication from the local or remote database that the textual information matches one or more keywords. The indication may indicate whether the visual/audible component identifies an overrun or change in content source of another media asset.

At step 680, the processed visual/audible component is cross-referenced with a database to identify a second content source identified by the visual/audible component. For example, control circuitry 304, upon receiving indication from the database that the textual information is associated with a change in content source, control circuitry 304 may generate an SQL query with one or more adjacent words in the textual information. The SQL query may be transmitted to the local or remote database to identify the content source indicated by the textual information. The second content source may be identified by the database as being associated with the textual information.

At step 682, the identified second content source from which the first media asset will be transmitted at the start time is selected.

At step 683, a content source parameter of the scheduled recording of the first media asset is changed/modified from the first content source to the second content source. For example, control circuitry 304 may update the recording parameters, of the first media asset, stored in storage 308 to identify the second content source instead of the first content source.

At step 684, the first media asset is recorded at the start time from the second content source instead of the first content source. For example, control circuitry 304 may initiate recording of the first media asset based on the information contained in the recording parameters which may identify the second content source.

At step 690, the scheduled recording of the first media asset is extended by modifying an end time parameter of the scheduled recording. For example, control circuitry 304 may automatically add a predetermined or user specified amount of time (e.g., 30 minutes) to the end time specified in the end time recording parameter of the first media asset when the audible/visual component indicates an overrun in the second media asset but the first media asset is still scheduled for transmission from the first content source. Alternatively, control circuitry 304 may prompt the user to add a predetermined or user specified amount of time (e.g., 30 minutes) to the end time specified in the end time recording parameter of the first media asset when the audible/visual component indicates an overrun in the second media asset but the first media asset is still scheduled for transmission from the first content source.

It should be understood that the above steps of the flow diagram of FIG. 6 may be executed or performed in any order or sequence not limited to the order and sequence shown and described in the figure. Also, some of the above steps of the flow diagram of FIG. 6 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method for modifying a scheduled recording, the method comprising:
   scheduling a recording of a first media asset from a first content source, wherein the first media asset is scheduled for transmission at a start time from the first content source, and wherein the start time of the first media asset follows a scheduled end time of transmission of a second media asset from the first content source;
   detecting that the transmission of the second media asset from the first content source will continue beyond the scheduled end time: monitoring, using monitoring circuitry, at least one of a visual component and an audible component of the second media asset to generate textual information, wherein the monitoring circuitry includes a speech-to-text engine;
   responsive to the detecting, determining, based on the generated textual information, that a content source from which the first media asset was originally scheduled to be transmitted at the start time has been changed from the first content source to a second content source; and
   modifying the scheduled recording of the first media asset to record the first media asset at the start time from the second content source instead of the first content source.

2. The method of claim 1, wherein the determining is based on the visual component, further comprising processing the textual information to identify a word or phrase that indicates that the second media asset will continue beyond the scheduled end time and that a content source from which the first media asset was originally scheduled to be transmitted at the start time has been changed.

3. The method of claim 2, wherein the word or phrase identifies the second content source.

4. The method of claim 1, wherein the first media asset is recorded from the second content source while the second media asset continues to be transmitted from the first content source.

5. The method of claim 1 further comprising:
   monitoring the at least one of the visual component and the audible component of the second media asset from the first content source while the first media asset is being recorded from the second content source;
   determining when the second media asset will end based on the monitored at least one of the visual component and the audible component of the second media asset; and
   modifying the scheduled recording of the first media asset to record the first media asset from the first content source instead of the second content source when the second media asset ends.

6. The method of claim 1, wherein a first portion of the first media asset is recorded from the first content source and a second portion of the first media asset is recorded from the second content source.

7. The method of claim 1, wherein the detecting that the transmission of the second media asset will continue beyond the scheduled end time is performed based on the at least one of the visual component and the audible component of the second media asset.

8. The method of claim 1, wherein the detecting that the transmission of the second media asset will continue beyond the scheduled end time is performed in response to receiving a trigger from the first content source indicating that the transmission will continue beyond the scheduled end time.

9. The method of claim 1, wherein the visual component includes at least one of closed-caption information, a score associated with the second media asset, a visual prompt, and a banner that includes a message that indicates that the content source from which the first media asset was originally scheduled to be transmitted at the start time has been changed.

10. The method of claim 1, wherein the audible component includes an audible message or announcement that indicates that the content source from which the first media asset was originally scheduled to be transmitted at the start time has been changed.

11. A system for modifying a scheduled recording, the system comprising:
control circuitry configured to:
schedule a recording of a first media asset from a first content source, wherein the first media asset is scheduled for transmission at a start time from the first content source, and wherein the start time of the first media asset follows a scheduled end time of transmission of a second media asset from the first content source;
detect that the transmission of the second media asset from the first content source will continue beyond the scheduled end time monitor, using monitoring circuitry, at least one of a visual component and an audible component of the second media asset to generate textual information, wherein the monitoring circuitry includes a speech-to-text engine;
responsive to the detecting, determine, based on the generated textual information, that a content source from which the first media asset was originally scheduled to be transmitted at the start time has been changed from the first content source to a second content source; and
modify the scheduled recording of the first media asset to record the first media asset at the start time from the second content source instead of the first content source.

12. The system of claim 11, wherein the determining is based on the visual component, and wherein the control circuitry is further configured to process the textual information to identify a word or phrase that indicates that the second media asset will continue beyond the scheduled end time and that a content source from which the first media asset was originally scheduled to be transmitted at the start time has been changed.

13. The system of claim 12, wherein the word or phrase identifies the second content source.

14. The system of claim 11, wherein the first media asset is recorded from the second content source while the second media asset continues to be transmitted from the first content source.

15. The system of claim 11, wherein the control circuitry is further configured to:
monitor the at least one of the visual component and the audible component of the second media asset from the first content source while the first media asset is being recorded from the second content source;
determine when the second media asset will end based on the monitored at least one of the visual component and the audible component of the second media asset; and
modify the scheduled recording of the first media asset to record the first media asset from the first content source instead of the second content source when the second media asset ends.

16. The system of claim 11, wherein a first portion of the first media asset is recorded from the first content source and a second portion of the first media asset is recorded from the second content source.

17. The system of claim 11, wherein the detection is performed based on the at least one of the visual component and the audible component of the second media asset.

18. The system of claim 11, wherein the detection is performed in response to receiving a trigger from the first content source indicating that the transmission will continue beyond the scheduled end time.

19. The system of claim 11, wherein the visual component includes at least one of closed-caption information, a score associated with the second media asset, a visual prompt, and a banner that includes a message that indicates that the content source from which the first media asset was originally scheduled to be transmitted at the start time has been changed.

20. The system of claim 11, wherein the audible component includes an audible message or announcement that indicates that the content source from which the first media asset was originally scheduled to be transmitted at the start time has been changed.

* * * * *